UNITED STATES PATENT OFFICE.

MARIE JEAN DE CHANTÉRAC, OF PARIS, AND MARIE JOSEPH DENIS ALEXANDRE DE LA BAUME, OF TOURTOUR, FRANCE, ASSIGNORS TO LA SOCIÉTÉ CIVILE POUR L'EXPLOITATION DE BREVETS D'INVENTION CONCERNANT L'INDUSTRIE DE L'ALCOOL, OF PARIS, FRANCE.

PURIFICATION OF ALCOHOLIC LIQUIDS.

SPECIFICATION forming part of Letters Patent No. 645,940, dated March 27, 1900.

Application filed January 3, 1898. Serial No. 665,460. (No specimens.)

*To all whom it may concern:*

Be it known that we, MARIE JEAN DE CHANTÉRAC, residing at Paris, and MARIE JOSEPH DENIS ALEXANDRE DE LA BAUME, residing at Tourtour, Var, France, have invented certain new and useful Improvements in the Purification of Alcoholic Liquids, (for which we have obtained French Patent No. 269,372, dated August 6, 1897,) which are fully set forth in the following specification.

This invention relates to improvements in the purification of alcoholic liquids.

With the ordinary method of treating alcoholic liquids, in spite of all the improvements which the apparatus has undergone, only a greater or less proportion of alcohol which is pure and of good flavor is obtained; but this proportion is insufficient. A process patented by Messieurs Rosseau, de la Baume, and de Chantérac (see United States Letters Patent No. 470,447, dated March 8, 1892) and based upon the exclusive employment of tartrates and hyposulfites, with the object of eliminating substances having a bad flavor, has already enabled this defect to be overcome. This process is capable of being still further improved without modifying the usual plant of factories. In fact, addition of tartrates and hyposulfites performs a double office in the process to which we have just referred—first, to neutralize the alcoholic liquid, and, second, to effect a combination of the reagents with the ill-flavored bodies for the purpose of giving compounds which may be readily eliminated by the process of rectification.

This invention relates to a process for the purification of alcohol and alcoholic liquids characterized by the employment of a suitable alkaline substance in conjunction with tartrates and hyposulfites, the employment of these substances being effected in such a manner that the neutralization is performed by the alkaline substance, which is very low in price, while the elimination of the ill-flavored substances is effected by the combination of these substances with the added tartrates and hyposulfites.

By way of example we will now indicate the method by means of which, given an alcoholic liquid of any kind, the relative quantities of alkaline bodies, of tartrate, and of hyposulfite which are capable of acting in the most efficacious manner possible may be calculated.

In order, first of all, to ascertain the quantity of the alkaline substance which it is necessary to employ, we make use of the well-known method of determining the amount of acids present (after the carbonic acid has been expelled) by a normal solution, or preferably, for greater exactitude, a one-tenth normal solution, of soda, employing as an indicator phenol phthalein. It is in accordance with this indication that the acid in the alcoholic liquid to be treated is neutralized. This first indication having been obtained, we deduce from it the quantities of tartrate and hyposulfite necessary for the elimination of the ill-flavored substances.

We will suppose, by way of example, that an alcoholic liquid contains thirty grams of a mixture of acids expressed in acetic acid per hectoliter of absolute alcohol. If we also suppose that the alkaline substance employed is carbonate of soda, we shall require, in order to saturate thirty grams, 26.5 grams $NaCO^3$. Under these conditions we should employ twice this weight of double tartrate of potash and of soda (Rochelle salts) and one-half this weight of hyposulfite of soda. It will be understood that we may cause these relative proportions to vary according to the nature of the alcoholic liquid, and we only give them as a general guide. It is in fact extremely rare to meet with two products of commercial fermentation identical in constitution. In addition to this in most cases when the acidity tested is either above or below the ordinary average of fermented liquids the proportion of the tartrate and of the hyposulfite with regard to the alkaline substance will vary sensibly in inverse ratio to such acidity. After the reagents named dissolved in water are brought into contact with the alcoholic liquids the operations of distillation and rectification may be proceeded with in the apparatus usual in the industry.

Our novel process of purification, the cost of which is very small, has in addition the following advantages as regards the process above referred to: first, reduction of labor, since no stirring is necessary, and, second, economy in the substance, on the one hand, by the substitution of an inexpensive alkaline substance for a portion of the more expensive reagents (the tartrate and hyposulfite) hitherto employed, and, on the other hand, by preventing loss which may result from decantation or filtration, such operation not being necessary, and economy in the operation of the plant, since the charging-troughs need not be moved for what is sometimes a considerable time, contact of the liquids without agitation being sufficient.

The process does not therefore require any special plant, and the installation may be effected very speedily and with great ease.

All non-acid tartrates may be employed for the purification of alcohols. We, however, prefer to use tartrates of potash and of soda, more especially the double tartrate known by the name of "Rochelle salts." Among hyposulfites those of soda and of baryta have yielded excellent results.

Having now particularly described and ascertained the nature of our said invention and in what manner the same is to be performed, we declare that what we claim is—

The herein-described process of purifying alcoholic liquors, which consists in first treating such liquors with an alkaline substance such as carbonate of soda in quantity sufficient to neutralize the liquor, and subsequently with a tartrate and a hyposulfite in quantity sufficient to combine with the ill-flavored substance and form compounds capable of ready elimination.

In testimony whereof we have signed this specification in the presence of two subscribing witnesses.

MARIE JEAN DE CHANTÉRAC.
MARIE JOSEPH DENIS
ALEXANDRE DE LA BAUME.

Witnesses as to signature of Marie Jean de Chantérac:
ANTOINE ROUSSAUNES,
EDWARD P. MACLEAN.

Witnesses as to signature of Marie Joseph Denis Alexandre de la Baume:
JOSEPH KEONGE,
EMILE MAZARD.